Nov. 11, 1930.   A. DAVIDSON   1,781,368
POWER PLANT
Filed March 23, 1925    5 Sheets-Sheet 1

Fig. 1.

A. Davidson
INVENTOR

WITNESS

BY
ATTORNEY

Fig. 2.

Nov. 11, 1930.                A. DAVIDSON                1,781,368
                               POWER PLANT
                        Filed March 23, 1925        5 Sheets-Sheet 3

Fig. 3.

A. Davidson
   INVENTOR

WITNESS

BY

ATTORNEY

Nov. 11, 1930.  A. DAVIDSON  1,781,368
POWER PLANT
Filed March 23, 1925   5 Sheets-Sheet 4

Fig. 4.

A. Davidson
INVENTOR

WITNESS

BY
ATTORNEY

Nov. 11, 1930.  A. DAVIDSON  1,781,368
POWER PLANT
Filed March 23, 1925    5 Sheets-Sheet 5

Fig. 5.

A. Davidson
INVENTOR

WITNESS

BY

ATTORNEY

Patented Nov. 11, 1930

1,781,368

UNITED STATES PATENT OFFICE

ARCHER DAVIDSON, OF BRIGHTON, MASSACHUSETTS, ASSIGNOR TO WESTINGHOUSE ELECTRIC & MANUFACTURING COMPANY, A CORPORATION OF PENNSYLVANIA

POWER PLANT

Application filed March 23, 1925. Serial No. 17,702.

My invention relates to power plants, particularly to power plants in which the feed water for the boilers is translated through a series of heaters maintained at successively higher temperatures, and it has for an object to provide a method and arrangement of apparatus whereby the efficiency of existing power plants employing non-extraction turbines, that is, turbines which are not adapted for bleeding steam at various pressures and temperatures for heating feed water, etc., may be materially increased co-incident with the installation of additional prime movers in the plant.

These and other objects, which will be made apparent throughout the further description of my invention, may be attained by the employment of the apparatus hereinafter described and illustrated in the accompanying drawings in which.

It is generally recognized that a very effective and efficient system for heating the boiler feed water in a modern power plant is by the extraction of steam at various pressures and temperatures from the casings of the prime movers which are usually steam turbines. The steam is extracted at successively higher pressures and temperatures and is utilized in a series of heaters through which the feed water for the boilers is successively translated. It is a known fact that the reduction in the power developed by the prime mover, as the result of such a steam extraction process, is more than compensated for by the resultant increase in boiler room efficiency.

Heretofore, the efficiency of existing power stations employing only turbines of non-extraction type could not be readily improved by the installation of multiple stage heaters without involving radical and consequently very costly alterations in the construction of the existing prime movers. However, as it is common practice to increase the capacity of existing power plants from time to time by the installation of additional turbo-generators, I have conceived the idea of easily modernizing these existing plants, coincident with an increase in the capacity of the plant, by adding turbines of the extraction type and by so installing and constructing these turbines that such steam may be extracted therefrom as is required for heating the feed water of not only the additional turbines, but also of the turbines of the non-extraction type which are already contained in the plant. It is apparent that such an arrangement permits of the installation of stage feed heating for the entire power plant, resulting in a very material increase in operating efficiency. It is to be noted that this increase in efficiency is obtained without requiring any alterations whatsoever to the existing turbines, requiring merely the addition of stage heaters of sufficient capacity for heating all of the boiler feed water required by the plant.

Figure 1:
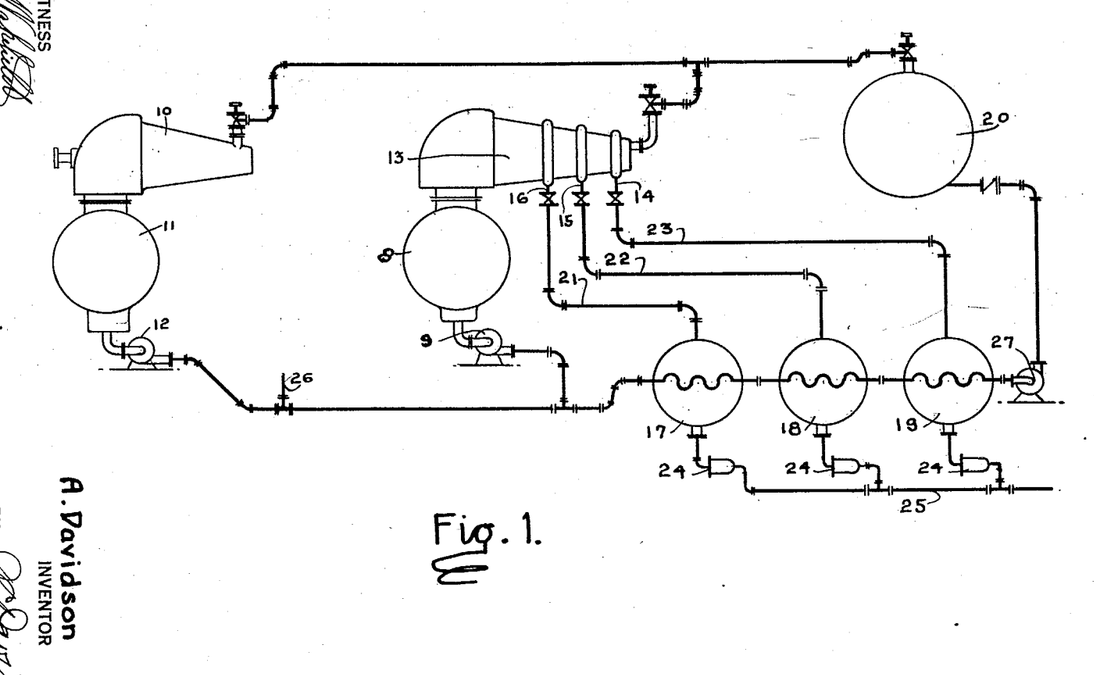
Fig. 1 is a diagrammatic arrangement of a power plant employing extraction and non-extraction turbines and in which the feed water for all of the boilers is conveyed through a single series of heaters which utilize, as heating fluid, steam derived from the extraction turbine only.

Referring to the drawings for typical illustrations of power plants arranged in accordance with my invention, I show, in Fig. 1, an existing prime mover 10 provided with a suitable surface condenser 11 and a condensate pump 12. The turbine 10 is of the non-extraction type, that is, the casing of the turbine makes no provision for withdrawing steam at various pressures between the inlet and the exhaust connections. I also show a turbine 13 which has been added to the plant subsequent to the installation of the turbine 10 and which is provided with three connections 14, 15 and 16, for bleeding steam at different pressures. The turbine 13 is also provided with a surface condenser 8 and a suitable condensate pump 9. The discharge from both condensate pumps 12 and 9 is conveyed successively through suitable heaters 17, 18 and 19 before being conveyed to a boiler 20 by a feed pump 27. The heaters 17, 18 and 19 are supplied respectively, by means of the conduits 21, 22 and 23, with steam at successively higher pressures, extracted from the turbine 13. The extracted steam, which is condensed in the respective heaters, may be conveyed by means of suitable steam traps 24 and a drain main 25 to any desired point in the power plant. Make-up feed water for the boilers may be supplied through a suitable connection 26.

It is apparent from the above description that the steam extracted from turbine 13 is utilized for heating the condensate removed, not only from its own condenser 8 but from the condenser 11 as well. Stage feed water heating is thus provided for both units 10 and 13, irrespective of the fact that the turbine 10 is not adapted for stage heating. While I have shown one turbine of the extraction type and one of the non-extraction type, it is to be understood that I may employ any number of turbines in either capacity.

Figure 2:
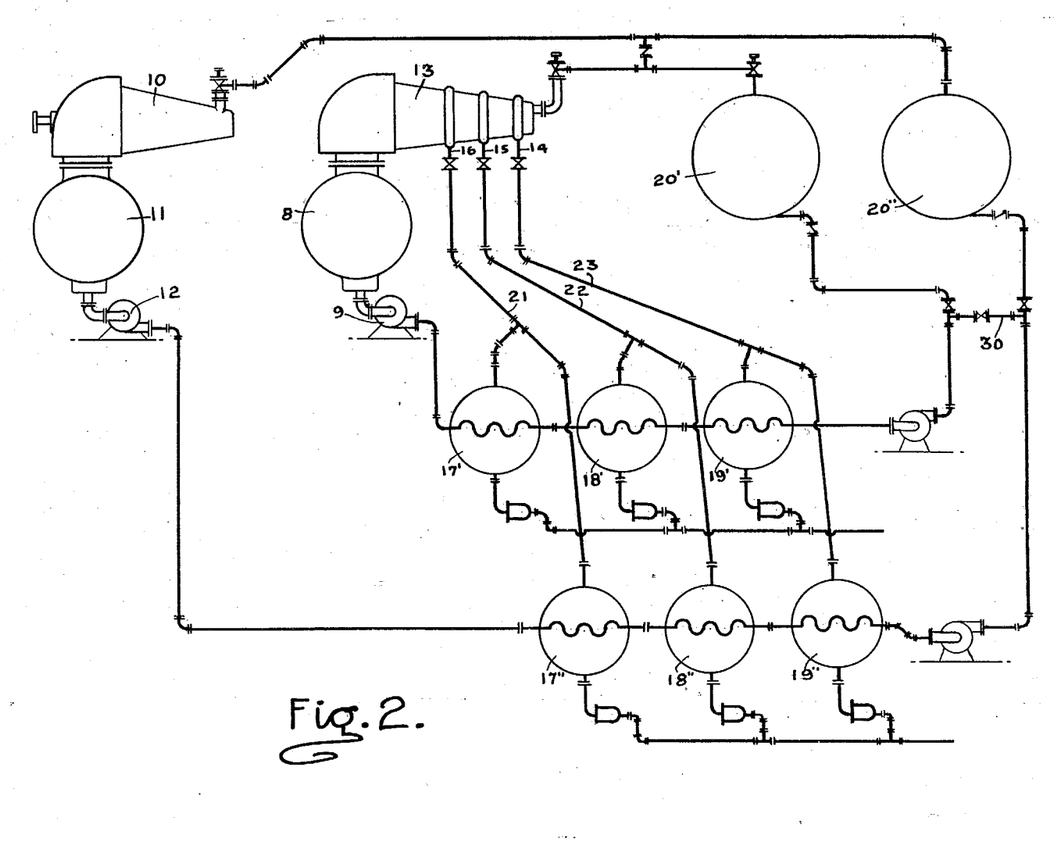
Fig. 2 is a diagrammatic arrangement of a power plant employing extraction and non-extraction turbines and in which a series of heaters for increasing the temperature of the boiler feed water is separately provided for each turbine, both series of heaters extracting steam from the extraction turbine.

In the arrangement illustrated in Fig. 1, a single boiler feed water system may be provided for more than one prime mover or for possibly the entire plant. It is sometimes desirable, however, to provide a separate feed water system for the battery of boilers associated with each prime mover together with suitable cross-over connections between the respective systems. I have therefore illustrated, in Fig. 2, a power plant arranged similarly to Fig. 1 except for the fact that the separate series of heaters 17', 18' and 19', and 17'', 18'' and 19'' are provided for the turbines 10 and 13. The condensate pumps 12 and 9 discharge condensate respectively through the two series of heaters to respective batteries of boilers, represented at 20' and 20''. A suitable cross-over connection 30 is provided between the two boiler feed systems. Both series of heaters are supplied with steam extracted from the turbine 13, the conduits 21, 22 and 23 being provided respectively with suitable branch conduits for distributing the steam between the two heaters of each stage.

Figure 3:
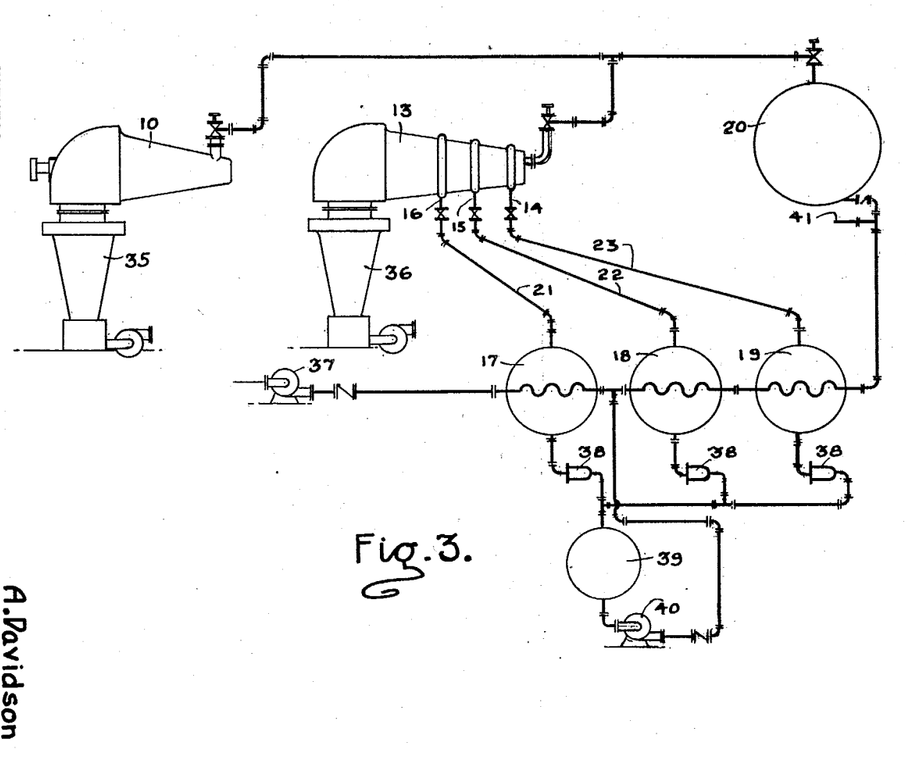
Fig. 3 is a diagrammatic arrangement of a power plant employing extraction and non-extraction turbines together with jet condensers and in which extraneous water, and not condensate, is fed to the boilers after passing through heaters utilizing as heating fluid, steam derived only from the extraction turbine.

In the power plant illustrated in Fig. 3, condensers of the jet type 35 and 36 are associated with the turbines 10 and 13. In view of the fact that such an arrangement requires the condensing water, usually raw water unsuited for boiler purposes to co-mingle with the condensed steam, it is necessary to supply the boilers with extraneous water which has been specially treated. I have therefore shown a boiler feed pump 37 which discharges extraneous water through the heaters 17, 18, and 19 receiving heating fluid from the extraction turbine 13. A quantity of the heated water may, if desired, be discharged through a connection 41 for use in process work. With such an arrangement, it is advisable to conserve as much as possible the condensate produced in the various heaters. I may, therefore, provide suitable drain traps 38 which discharge to a common tank 39 from which a pump 40 discharges the heater condensate through the heaters 18 and 19 with the feed water to the boiler 20. Such an arrangement materially decreases the amount of specially treated water required by the power plant.

In a very large number of existing power plants which employ turbines of the non-extraction type, some means are provided for heating the feed water prior to its entrance into the boiler. Such heaters are usually supplied with steam derived from the exhaust of the house turbo-generator or from such auxiliary machinery as the various turbines which drive the boiler feed pumps, the condenser circulating pumps, the deaerator pumps, etc. It is therefore desirable in converting such a plant to multiple stage heating, to incorporate as many of the existing heaters as possible, together with their piping systems, in the new arrangement.

Figure 4:
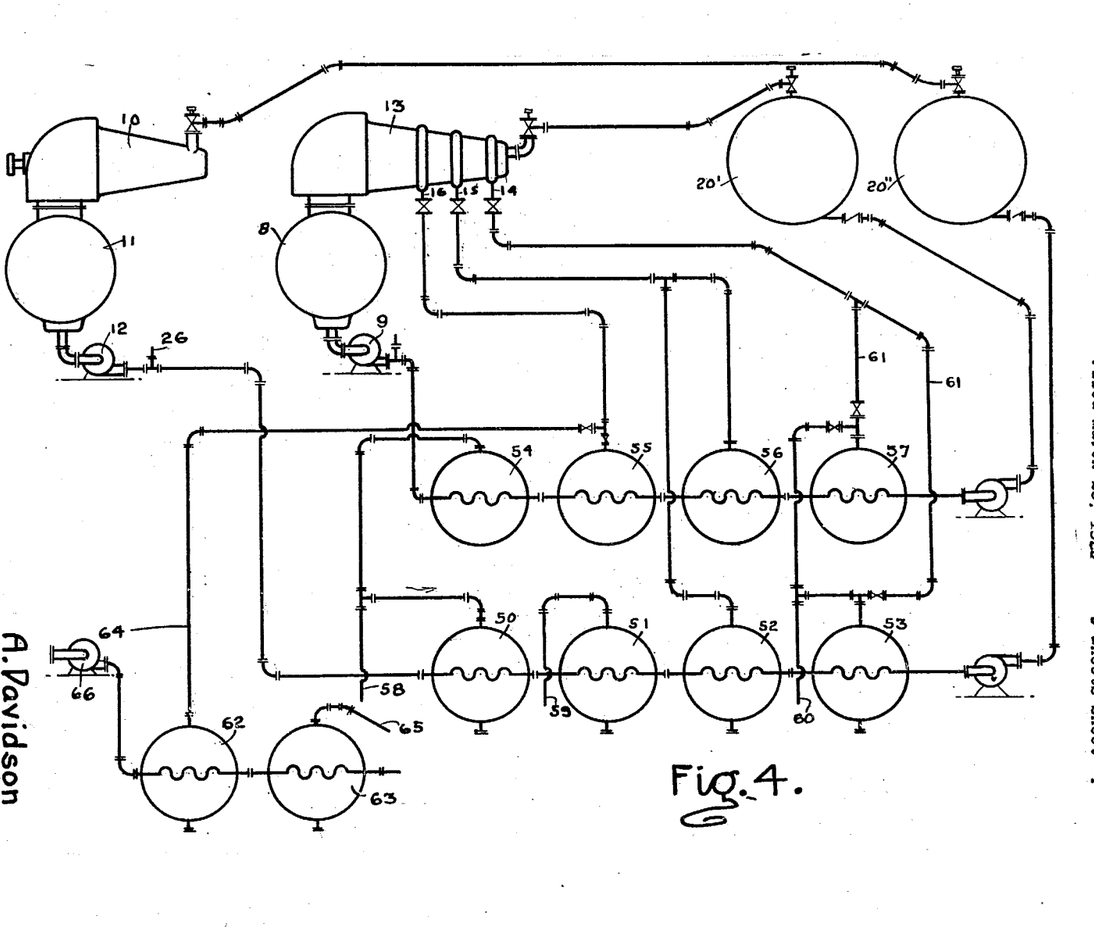
Fig. 4 is a diagrammatic arrangement of a power plant employing both existing and additional heaters which utilize as heating fluid steam derived from various sources in the plant and from a turbine of the extraction type.

I have therefore shown, in Fig. 4, a power plant in which the existing turbine is provided with a series of stage heaters 50, 51, 52 and 53, any number of which, such as 50 and 51, may have been contained in the existing power plant, while a series of new heaters 54, 55, 56 and 57 is provided for the additional turbine 13. I may, for example, supply the first stage heaters 50 and 54 and the second stage heater 51 with steam supplied from existing sources 58 and 59, should they be available. By existing sources I mean any available source of steam supply which might have previously existed in the plant or which has been created in the installation of such various auxiliary machinery as is required by the addition of turbine 13. The corresponding or second stage heater 55 may, if no suitable source of supply is available, be supplied with steam extracted from the stage 16 of the turbine 13. The third stage heaters 52 and 56 are both supplied with steam extracted from the stage 15 of the turbine 13, while the fourth stage heaters 53 and 57 may be supplied with steam obtained from an existing source 60. If it is questionable whether or not the supply of heating fluid 60 is adequate at all times under conditions of varying load, I may supplement this source of supply with a connection 61 from the stage 14 of the turbine 13.

As illustrated, the condensate derived from each of the condensers 11 and 8 is conveyed by the respective condensate pumps 12 and 9 through each series of heaters, and then to the respective boilers 20' and 20'' by boiler feed pumps 57' and 58', respectively. The temperature and pressure of the steam supplied to the respective heaters being successively higher from the first to the fourth stage, the condensate is continuously heated in its passage through the heaters. It is apparent that such an arrangement provides all the advantages of stage heating and at the same time permits of the use of all existing heaters which have heretofore been associated with a plant having no stage heating and no turbines of the extraction type.

I may also embody in the latter arrangement an additional series of heaters 62 and 63, one or more of which may be provided with heating fluid extracted from the turbine 13 by means of a connection 64. These heaters are adapted for heating water for such process work as vulcanizing, sugar refining, etc. In addition to the turbine 13, any other available source of steam supply such as the connection 65 might be utilized in any number of heaters. Extraneous water is conveyed through the heaters by a pump 66.

It is sometimes advisable in the interest of efficiency, to install additional prime movers operating at relatively higher working pressures than are employed in the existing prime movers. In this instance, separate feed water systems for the high and low pressure boiler systems must be provided. It is also frequently the case that the power plant contains existing heaters deriving steam from the exhaust connections of the various auxiliary machinery, the house turbine or from some other suitable source of supply and it may be advisable to embody this heater in the stage heating arrangement. This feature may readily be embodied, for example, in the arrangement shown in Fig. 4, which includes a separate feed water system and a boiler for each turbine.

Figure 5:
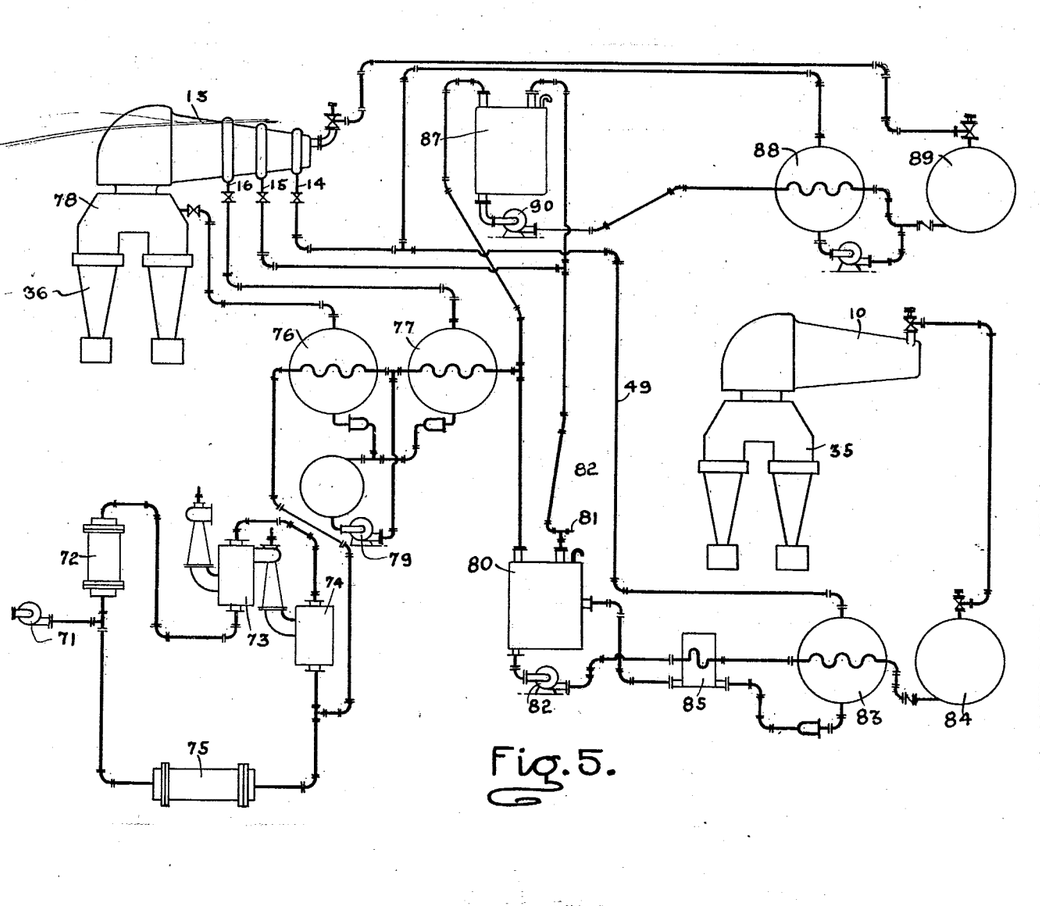
Fig. 5 is a diagrammatic arrangement of a power plant employing extraction and non-extraction turbines together with jet condensers in which two series of boilers are employed operating at relatively different pressures and in which stage heating for increasing the temperature of the boiler feed water is provided in accordance with my invention.

I have also shown, in Fig. 5, another arrangement including existing and additional turbines 10 and 13 operating at different steam pressures and provided respectively with jet condensers 35 and 36. Water, especially suited for boiler feed purposes, is provided by a suitable pump 71. A portion of this feed water is passed through an oil cooler 72, an air ejector inter-cooler 73 and an air ejector after-cooler 74. The remaining portion of the water is passed through a generator air cooler 75 after which the two portions are united and conveyed successively through a primary heater 76 and a first-stage heater 77. The heaters 76 and 77 are of such a capacity as to increase, to the proper degree, the temperature of the feed water required for the boilers of both the prime movers 10 and 13. Heater 76 derives its heating fluid from the exhaust connection 78 provided between the additional turbine 13 and the jet condenser 36. The heater 77 derives its fluid from the third stage 16 of the turbine 13. The condensate produced in the heaters 76 and 77 is returned to the boiler feed system by means of a pump 79 in a manner similar to that described in relation to Fig. 3.

The boiler feed water, upon being discharged from the first stage heater 77, is divided into two systems, one for feeding the boilers associated with the existing or relative low pressure prime mover 10 and one for feeding the boilers associated with the additional or relatively high pressure turbine 13. The water for the former system is conveyed to a heater 80 which may have been contained in the existing power plant and which utilizes, as heating fluid, steam obtained through a connection 81 communicating with the exhausts of the various auxiliary machinery or the house turbo-generator. I have so arranged the power plant that this existing heater 80 is utilized as a second stage heater. However, in order to insure adequate supply of steam thereto at all times, I may provide an additional steam connection 82 which communicates with the second stage 15 of the turbine 13, whereby steam may be readily extracted from the turbine 13 to compensate for any deficiencies occurring in the existing supply line. As the existing heaters are very frequently of the open type, I have located a boiler feed pump 82' on the discharge side of the heater 80. The pump 82' discharges through a third stage heater 83, deriving steam from the first stage of the turbine 13, to a boiler 84 for supplying relatively low pressure steam to the turbine 10. Condensate drained from the third stage heater 83 may be drained to the second stage or existing heater 80 through a heat exchange device 85 having boiler feed water discharged by the pump 82' passing therethrough.

The feed water for the boilers associated with the relatively high pressure turbine 13, after passing through the first stage heater 77, is conveyed successively through second and third stage heaters 87 and 88 and thence to a high pressure boiler 89 which generates steam for the high pressure turbine 13. The heater 87 may be of the open type to correspond with the heater 80 of the low pressure feed water system. Should this type of feed water heater be installed, I may locate the pump 90 for the high pressure boiler feed system between the second and third stage heaters 87 and 88.

It is apparent from the description of Fig. 5 that I may readily improve the efficiency of an existing power plant containing turbines of the non-extraction type by the addition of turbines of the extraction type. Furthermore, the latter turbines may operate at relatively higher pressures than the existing turbines in accordance with later power plant practice. While it is possible to provide an additional turbine which is adapted for supplying steam for heating all of the feed water required by the plant, nevertheless, as shown in Fig. 5, heaters already contained in the power plant and employing heating fluid from various existing sources may be embodied in the feed water heating system. It is to be understood that I may employ heaters of either the open or closed type, as determined by the plant conditions. Furthermore, I may also utilize in my boiler feed water heating system, various apparatus such as oil coolers, air coolers, air ejector coolers, etc., for assisting in increasing the temperature of the boiler feed water supplied to the boilers associated with not only the additional prime movers but the existing prime movers as well.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a power plant, the combination of a prime mover and a condenser, a heater for increasing the temperature of the condensate removed from the condenser, a boiler receiving condensate from said heater and supplying elastic motive fluid to said prime mover, a second prime mover and condenser, a second heater for increasing the temperature of the condensate removed from the second condenser, a second boiler receiving condensate from said second heater and supplying elastic motive fluid to said second prime mover, and means for utilizing motive fluid extracted from the second prime mover as heating fluid in both the first and second heaters, the total amount of motive fluid extracted and discharged from the second prime mover being greater than the amount of such fluid utilized as heating fluid.

2. In a power plant, the combination of two turbines, a series of stage heaters associated with each turbine, separate means for conveying water through each series of heaters, separate boilers supplying motive fluid at different pressures to the turbines and receiving feed water from the respective series of heaters, means for extracting steam from one of the turbines, and means for utilizing the extracted steam in at least one heater of each series, the total amount of steam extracted and discharged from said one turbine being greater than the amount of such steam utilized in said heaters.

3. In a power plant, the combination of two turbines, a series of stage heaters associated with each turbine, means for supplying extraneous steam to some of the heaters, means for extracting steam from one of the turbines and for utilizing the extracted steam in at least one heater of each series, and means for passing water separately through the heaters of each series.

4. In a power plant, the combination of two turbines, a series of heaters associated with each turbine, means for supplying extraneous steam to some of the heaters, means for extracting steam from one of the turbines and for utilizing the extracted steam in at least one heater of each series, means for utilizing both extracted steam and extraneous steam in the remaining heaters, and means for conveying the boiler feed water for each turbine through one series of heaters.

5. In a power plant, the combination of a first turbine installation including a turbine and a condenser connected thereto, a second turbine installation including a turbine and a condenser connected thereto, the condensers of both installations operating and discharging condensed media independently, separate motive fluid generating apparatus for supplying motive fluid to each installation, the motive fluid generating apparatus for the second installation supplying motive fluid thereto at a pressure higher than that at which motive fluid is supplied to the first installation, feed water heating means, means for extracting fluid from the turbine of the second installation between the inlet and exhaust connections thereof and for supplying it to the feed water heating means, and means for passing the condensed media from all of said condensers through the heating means to the motive fluid generating apparatus, the total amount of fluid extracted and discharged from the turbine of the second installation being substantially greater than the fluid extracted therefrom and supplied to the feed water heating means.

6. In a power plant, the combination of a first turbine installation including a turbine, a condenser connected thereto, a boiler supplying steam thereto and means for heating the feed water supplied to the boiler, a second turbine installation including a turbine, a condenser connected thereto, a boiler supplying steam to the turbine at a pressure higher than that at which steam is supplied in the first turbine installation and means for heating the feed water supplied to the boiler, the condensers of both installations operating and discharging condensed media independently, means for extracting steam from the turbine of the second installation and for supplying it to the heating means of both installations, and separate means for passing condensate from each condenser through the heating means and to the boiler of the respective installation.

7. In a power plant, the combination of a first turbine and condenser installation, a boiler supplying steam thereto, a second turbine and condenser installation, a second boiler for supplying steam to the second turbine at a higher pressure, the condensers of both installations operating and discharging condensed media independently, means for heating feed water supplied to the boilers, and means for extracting steam from the second turbine and supplying it to the heating means.

8. In a power plant, the combination of a non-extraction turbine, a boiler and a feed-water heater associated therewith, means for conveying water through said heater to said boiler, an extraction turbine, a boiler and a feed-water heater associated therewith, means for conveying water through said second heater to said second boiler, and means for supplying both of said heaters with heating fluid extracted from said extraction turbine.

9. In a power plant, the combination of two turbines, a heater and a boiler associated with each turbine, means for conveying water through said heaters to the respective boilers of the turbines, and means for extracting steam from one of said turbines and for utilizing the extracted steam in a heater of each of said turbines.

10. In a power plant, the combination of a turbine installation including a steam turbine, a condenser therefor, a boiler supplying steam thereto, and a heater for heating the feed water supplied to said boiler, a second turbine installation including a steam turbine, a condenser therefor, a boiler supplying steam thereto, and a plurality of heaters for heating the feed water supplied to said second boiler, means for extracting steam from the turbine of the second installation and utilizing the same in the heater of the first installation and in at least one heater of the second installation, and means for utilizing the available heat from a power plant auxiliary in another heater of the second installation.

11. In a power plant, the combination of a first turbine installation including a turbine and a boiler supplying motive fluid thereto, a second turbine installation including a second turbine and a second boiler supplying motive fluid thereto, means for supplying feed liquid to said boilers, means for heating the feed liquid supplied to said boilers, and means for extracting motive fluid from the turbine of the second installation and utilizing it in the heating means as heating fluid.

12. In a power plant, the combination of two turbines, a condenser, a heater, and a boiler associated with each turbine, means for conveying water through said heaters to the respective boilers of the turbines, and means for extracting steam from one of said turbines and for utilizing the extracted steam in a heater of each of said turbines, the total amount of motive fluid extracted and discharged from the last-mentioned turbine being greater than the amount thereof utilized as heating fluid, the condenser of the last-mentioned turbine condensing the motive fluid which is discharged therefrom and not utilized as heating fluid.

13. In a power plant, the combination of first turbine installation including a turbine and a boiler supplying motive fluid thereto, a second turbine installation including a turbine operating at a relatively higher pressure than the first-mentioned turbine and a boiler supplying motive fluid thereto at said relatively higher pressure, means for supplying feed liquid to said boilers, and means for extracting partially expanded fluid from the second-mentioned turbine and utilizing the same to heat the liquid supplied to both of said boilers.

14. In a power plant, the combination of a first turbine installation comprising a turbine, a boiler supplying motive fluid thereto, a series of heaters for heating motive fluid supplied to the boiler and a condenser for the turbine, a second turbine installation including a turbine, a boiler supplying motive fluid thereto at a pressure higher than in the first turbine installation, a series of heaters for heating the feed water supplied to the second-mentioned boiler, and a condenser for the second-mentioned turbine, means for extracting partially expanded motive fluid from the turbine of the second installation and supplying the same to a heater in each series as heating fluid, the condenser of the second turbine condensing the motive fluid discharged therefrom and not utilized as heating fluid.

15. In a power plant, the combination of a first turbine installation comprising a turbine, a boiler supplying motive fluid thereto, a series of heaters for heating motive fluid supplied to the boiler and a condenser for the turbine, a second turbine installation including a turbine, a boiler supplying motive fluid thereto at a pressure higher than in the first turbine installation, a series of heaters for heating the feed water supplied to the second-mentioned boiler, and a condenser for the second-mentioned turbine, means for extracting partially expanded motive fluid from the turbine of the second installation and supplying the same to at least one heater in each series as heating fluid, the condenser of the second turbine condensing the motive fluid discharged therefrom and not utilized as heating fluid, and means for utilizing the available heat from a power plant auxiliary in another heater of the second installation.

In testimony whereof, I have hereunto subscribed my name this nineteenth day of February, 1925.

ARCHER DAVIDSON